United States Patent
Hershorin et al.

(10) Patent No.: US 11,761,399 B2
(45) Date of Patent: *Sep. 19, 2023

(54) IO INTEGRATION OF AN ELECTRONIC CONTROL UNIT

(71) Applicants: Jacob Hershorin, Wilmington, NC (US); Christopher Kontos, Wilmington, NC (US); Robert Sayman, Wilmington, NC (US)

(72) Inventors: Jacob Hershorin, Wilmington, NC (US); Christopher Kontos, Wilmington, NC (US); Robert Sayman, Wilmington, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,286

(22) Filed: Jun. 13, 2022

(65) Prior Publication Data

US 2023/0175454 A1    Jun. 8, 2023

Related U.S. Application Data

(63) Continuation of application No. 17/546,024, filed on Dec. 8, 2021, now Pat. No. 11,371,463.

(60) Provisional application No. 63/122,488, filed on Dec. 8, 2020.

(51) Int. Cl.
*F02D 41/40* (2006.01)
*F02D 41/00* (2006.01)

(52) U.S. Cl.
CPC ....... *F02D 41/401* (2013.01); *F02D 41/0097* (2013.01); *F02D 2200/0616* (2013.01); *F02D 2200/101* (2013.01)

(58) Field of Classification Search
CPC .............. F02D 41/401; F02D 41/0097; F02D 2200/101; F02D 2200/0616
USPC .......... 123/472, 479, 480, 490; 701/102–105
See application file for complete search history.

(56) References Cited

U.S. PATENT DOCUMENTS

2017/0292898 A1* 10/2017 Schweikert ............. F02D 41/28
2019/0098778 A1*  3/2019 Pandey .................. H01R 31/06

* cited by examiner

*Primary Examiner* — Hai H Huynh
(74) *Attorney, Agent, or Firm* — Christopher Mayle

(57) ABSTRACT

A system and method for an electronic control unit adapter used to supplement existing electronic control units for enhanced or additional IO integration, the electronic control unit adapter designed to be updated easily by the end user in order to add functionality as it is developed thus prolonging the viability of an electronic control unit or vehicle, the electronic control unit adapter usable in conjunction with a vehicle or other vessel using an internal combustion engine or similar technology.

19 Claims, 13 Drawing Sheets

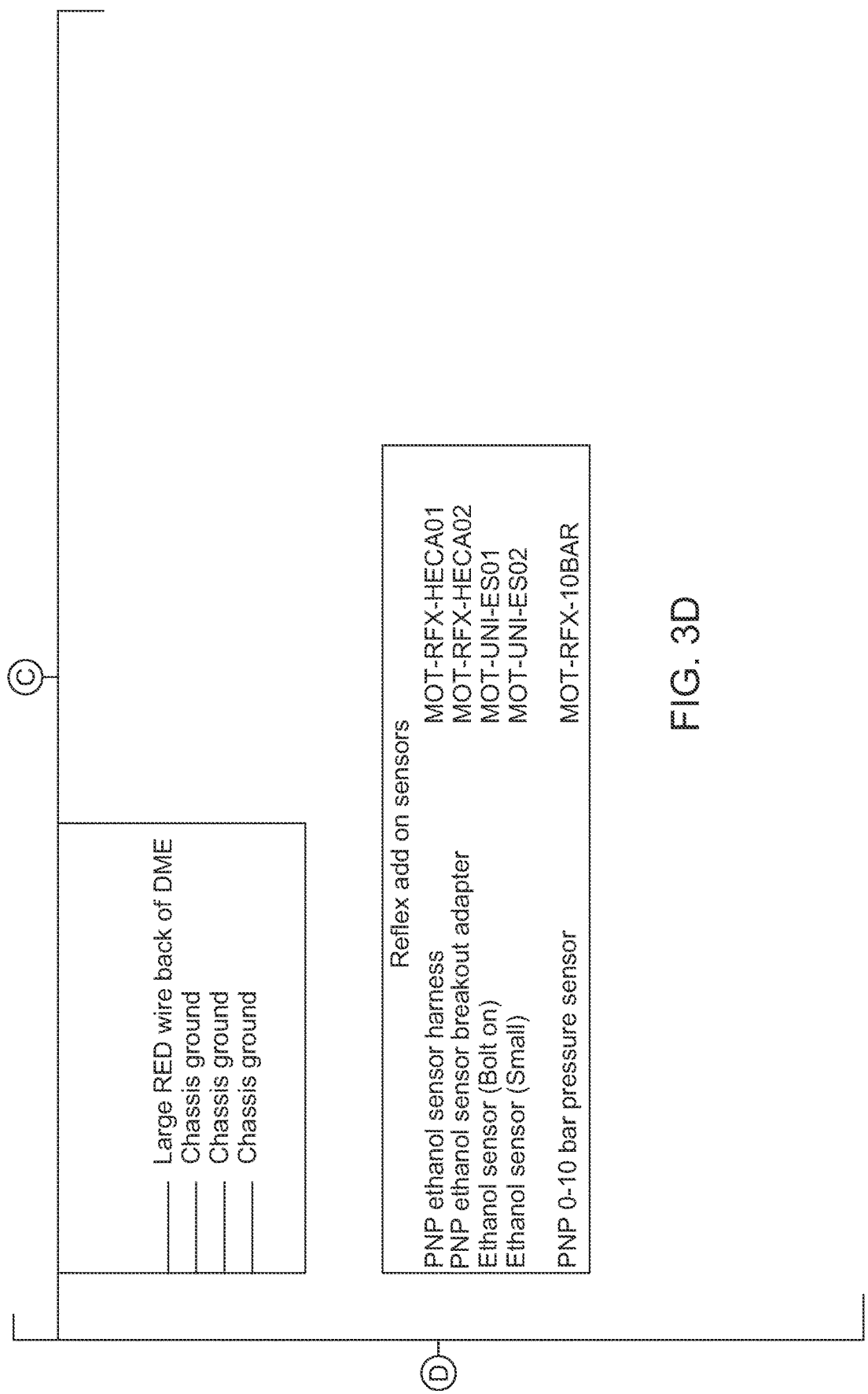

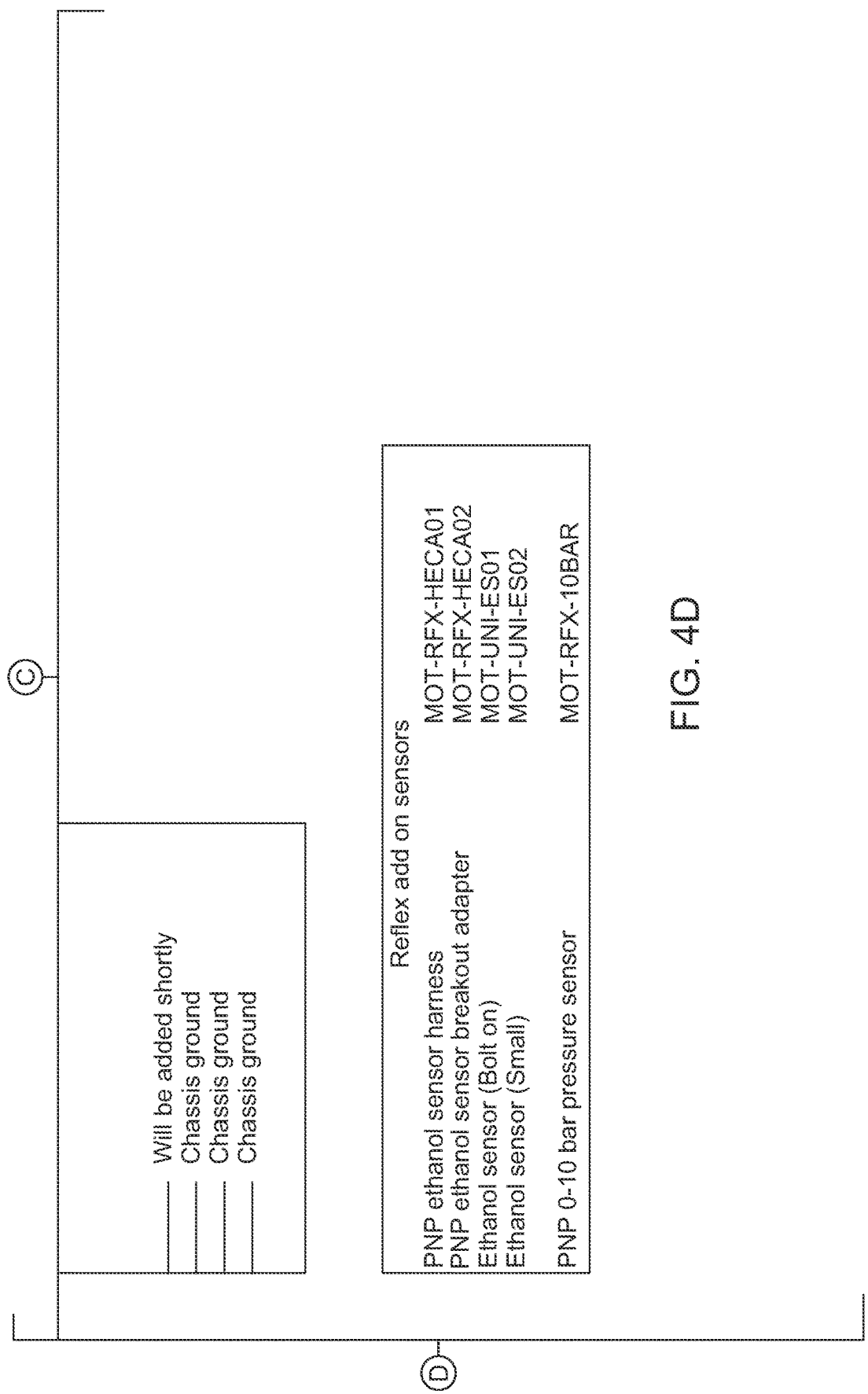

Trigger 2 - 4-20mA sensor input

IO INTEGRATION OF AN ELECTRONIC CONTROL UNIT

CROSS REFERENCE TO RELATED APPLICATIONS

This application is a continuation of the non-provisional application Ser. No. 17/546,024 filed on Dec. 8, 2021 which claims priority to U.S. Provisional Application No. 63/122,488 filed on Dec. 8, 2020, which is incorporated by reference in its entirety.

FIELD OF DISCLOSURE

The overall field of this invention is a system and method for electronic control unit adapters for a vehicle and more particularly for an electronic control unit adapter used to supplement a preexisting electronic control unit with additional input/output devices and other vehicle or vehicle control integration.

BACKGROUND

Modern day automobiles have become increasingly complex. Electronics have begun to enhance the control over every function of the automobile. The electronics are designed precisely control the operation of the internal combustion engine. The controls can be used for any number of operations such as for determining how much fuel is to be consumed to limiting the output produced based on the emissions during a particular operation. This complexity in electronic control units has led to an ever increasing customization of automobile electronic control units. In accordance with this each control unit may be specifically tailored to one or more particular associated Inputs/Outputs for a preexisting automobile. Whilst such a configuration appears to afford the most economic and technically satisfactory solution, on closer analysis this may not in fact be the case. The control units may need new IO integration to perform specific tasks whereby the electronic control units then would need to be replaced by a new electronic control unit which then involves more certification and increased development costs. Thus exists a system and method to supplement a preexisting electronic control unit with enhanced IO integration and other integration for the particular need of the user.

SUMMARY

The embodiments of the present invention are directed to an electronic control unit for supplementing a preexisting electronic control unit of a vehicle with additional integration for an engine, the electronic control unit including a circuit board and one or more inputs and a connection system, the connection system in communication with the electronic control unit, whereby the connection system is connected to the electronic control unit by a CANbus, whereby the CANbus facilitates output in a form of a wastegate duty converting a electronic wastegate signal to a DC output for controlling standard 3 port and 4 port boost solenoids for use with external wastegates, whereby the one or more inputs are configured via a USB connection to a computing device via a program for editing and upload or download of calibration and configuration values, the electronic control unit including EEPROM having configuration data, whereby the EEPROM is erasable and reprogrammable through an application of an increased electrical voltage, the EEPROM having a main state that tracks the one or more inputs to determine when the engine is running and injections that are required, the connection system having one or more injector driver connectors for coupling to one or more injector drivers, the connection system having one or more injector supply connectors for coupling to one or more injector supplies, the connection system having one or more crankshaft signal connectors for receiving a crankshaft signal in a form of a pulse train of a predetermined angular interval corresponding to a rotation of a crankshaft of the engine and measuring a pulse interval of the crankshaft signal, the connection system having one or more manifold absolute pressure sensor signal connectors for engine load input and to calculate an amount of fuel to inject into one or more cylinders of the engine, the connection system having one or more intake cam signal connectors used for gathering information about a camshaft speed of the vehicle, the connection system having one or more auxiliary control connectors and one or more auxiliary controls whereby the one or more auxiliary controls are active-low FET circuits configured via TPRT via individual calibration tables with MAP and RPM as an x and y axis, the connection system having one or more ethanol sensor connectors with an ethanol sensor whereby the ethanol sensor sends a respective first signal to electronic control unit adapter corresponding with an amount of alcohol in fuel of the vehicle.

The embodiments of the present invention are also directed to an electronic control unit for supplementing a preexisting electronic control unit, the electronic control unit including a circuit board and one or more inputs and a connection system, the connection system in communication with the electronic control unit, the electronic control unit operable as a separate standalone in addition to a parallel module in conjunction with the electronic control unit, the electronic control unit having output integration for sequential port fuel injection for four to eight cylinder engines utilizing a manifold absolute pressure sensor RPM Table with configurable triggers for any suitable vehicle application, the electronic control unit further having a built in ethanol content analyzer providing flex fuel capability and port injection scaling based on real time data or vehicle conditions.

BRIEF DESCRIPTION OF DRAWINGS

The present invention will be described by way of exemplary embodiments, but not limitations, illustrated in the accompanying drawings in which like references denote similar elements, and in which:

FIGS. 3A-3D depict an illustration showing definitions of pins of one embodiment of electronic control unit adapter.

FIGS. 4A-4D depict an illustration of another embodiment of pins of another embodiment of electronic control unit adapter.

DETAILED DESCRIPTION

Figure 1:
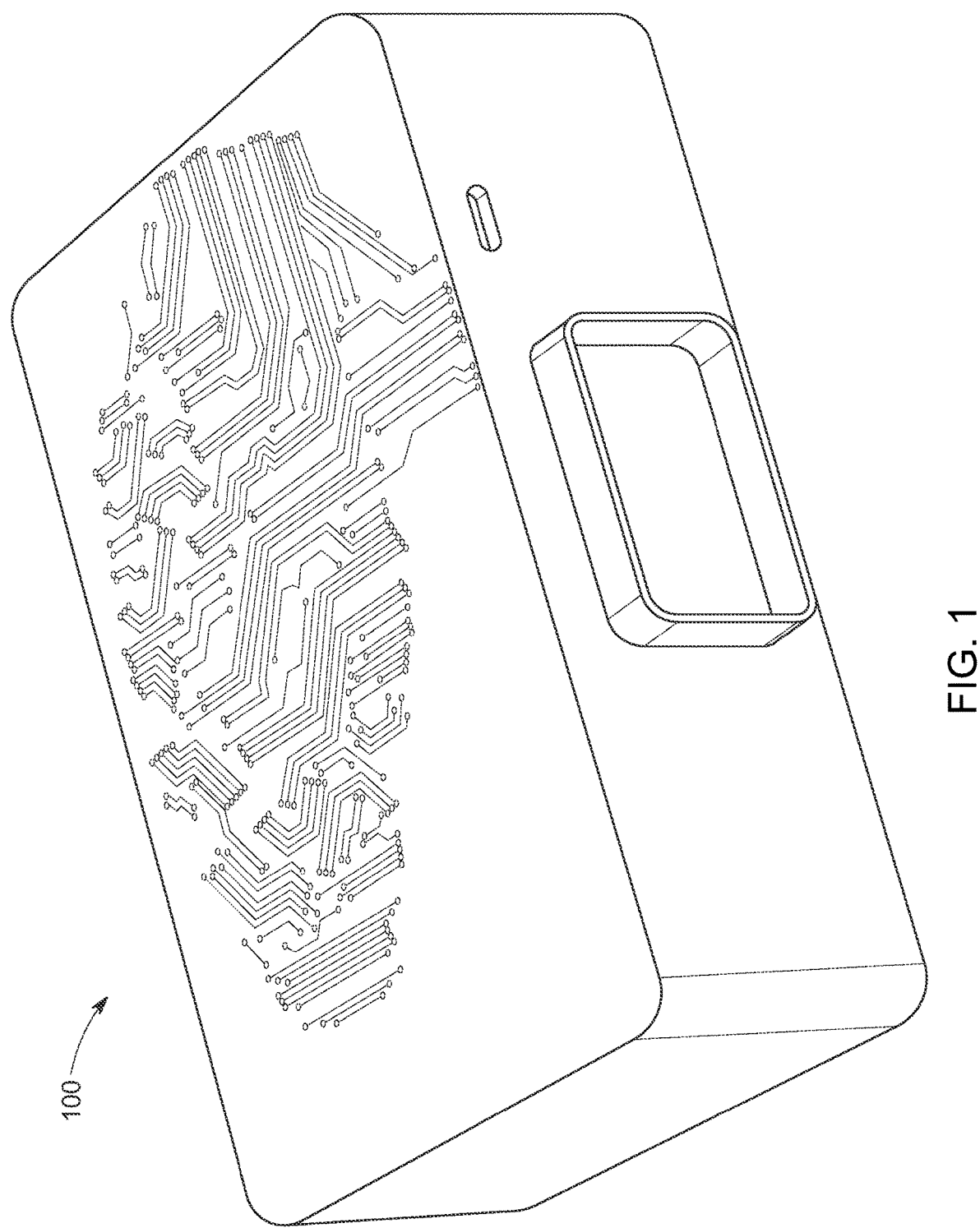
FIG. 1 depicts an illustration of an electronic control unit adapter in accordance with the present invention.

In the Summary above and in this Detailed Description, and the claims below, and in the accompanying drawings, reference is made to particular features of the invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure recognizes the unsolved need for an improved system and method for an electronic control unit adapter used to supplement preexisting electronic control units for enhanced or additional IO integration. The electronic control unit adapter is designed to be updated easily by the end user in order to add functionality as it is developed thus prolonging the viability of an electronic control unit or vehicle. It should be understood that the electronic control unit may instead be a Digital Motor Electronics (DME) or Engine Control Module (ECM) and the terms are interchangeable with respect to this Specification. Electronic control unit adapter may be used in conjunction with a vehicle or other vessel using an internal combustion engine or similar technology. The present invention may of course also be used in other fields outside of a motor vehicle, for example, in an aircraft, space vehicles, or machine tools. The electronic control unit adapter has the ability to also function as a separate standalone in addition to a parallel module in conjunction with the electronic control unit.

The electronic control unit adapter may provide advance input output integration for sequential port fuel injection for 4 to 8 cylinder engines utilizing a 24×24 manifold absolute pressure sensor (MAP) VS RPM Table with fully configurable triggers for any suitable vehicle application. Electronic control unit adapter may have support for a built in ethanol content analyzer providing DME flex fuel capability and port injection scaling based on real time data or vehicle conditions. Electronic control unit adapter may have additional auxiliary outputs including a progressive/pulse width modulation methanol control, a progressive/pulse width modulation nitrous control, an auxiliary fuel pump trigger, an exhaust cutout control, and an external boost control. These outputs may have 12×12 resolution tables for control in TunerPro R/T. These may be configured to run as on/off, digital, frequency (25 hz), or proportional, integral, and derivative (closed loop error control) (PID). Electronic control unit adapter may have additional auxiliary inputs including fuel pressure (0-10 bar), oil pressure (0-10 bar), EMAP, exhaust gas back pressure (0-10 bar), and coolant pressure (0-10 bar).

The internal combustion engine may include an electronic set up for operation with an electronic fuel injector system. In one or more non-limiting embodiments the internal combustion engine may include a plurality of cylinders each having a piston and at least one or more intake valves and one or more exhaust valve. The valves may be moved by a camshaft and the pistons may move a crankshaft.

The internal combustion engine may be controlled by an electronic control unit or ECU. The engine control unit may provide all electrical and electronic communication between the various subsystems of the internal combustion engine and other systems of the vehicle. Electronic control unit initially is responsible for overseeing, regulating and altering the operation of the electronic systems in the automobile, such as but not limited to ignition, emissions, cooling or electronic fuel injection setup. Electronic control unit may have a plurality of inputs and outputs. Inputs may be connected to a wide array of sensors on the engine which provide the electronic control unit with essential engine information. Sensors required to operate the internal combustion engine may include but are not limited to cam shaft sensor, a crank shaft sensor, MAP sensors, detonation sensors, temperature sensors, nitrous oxide sensors, or other sensors known by those of ordinary skill in the art.

Once the sensor information is received and processed using one or more fuel and ignition tables, the electronic control unit may create one or more commands based on the information received from the signals of from the one or more sensors. The electronic control unit may then transmit the commands and controls out via the electronic outputs to the fuel and ignition system. The electronic control unit may be any different number and types of electronic control units commonly known those by ordinary skill in the art. In one or more non-limiting embodiments electronic control unit may be connected to otherwise communicating with a remote communicator. The remote communicator receives data from the electronic control unit and transmits the data to a remote location for further analysis.

Electronic control unit adapter 100 may be used in conjunction with the internal combustion engine of the vehicle to supplement the existing electronic control unit whereby electronic control unit adapter 100 may provide additional input and output between the existing electronic control unit and the internal combustion engine. Electronic control unit adapter 100 has the ability to integrate aftermarket parts and add-ons for automobiles to a factory electronic control unit as well as other modules to be controlled, monitored, and logged as though they were factory components. This may be achieved through proprietary CANbus communications with the factory engine control unit. The module functions as an input and output expansion module for factory ECU.

Figure 2:
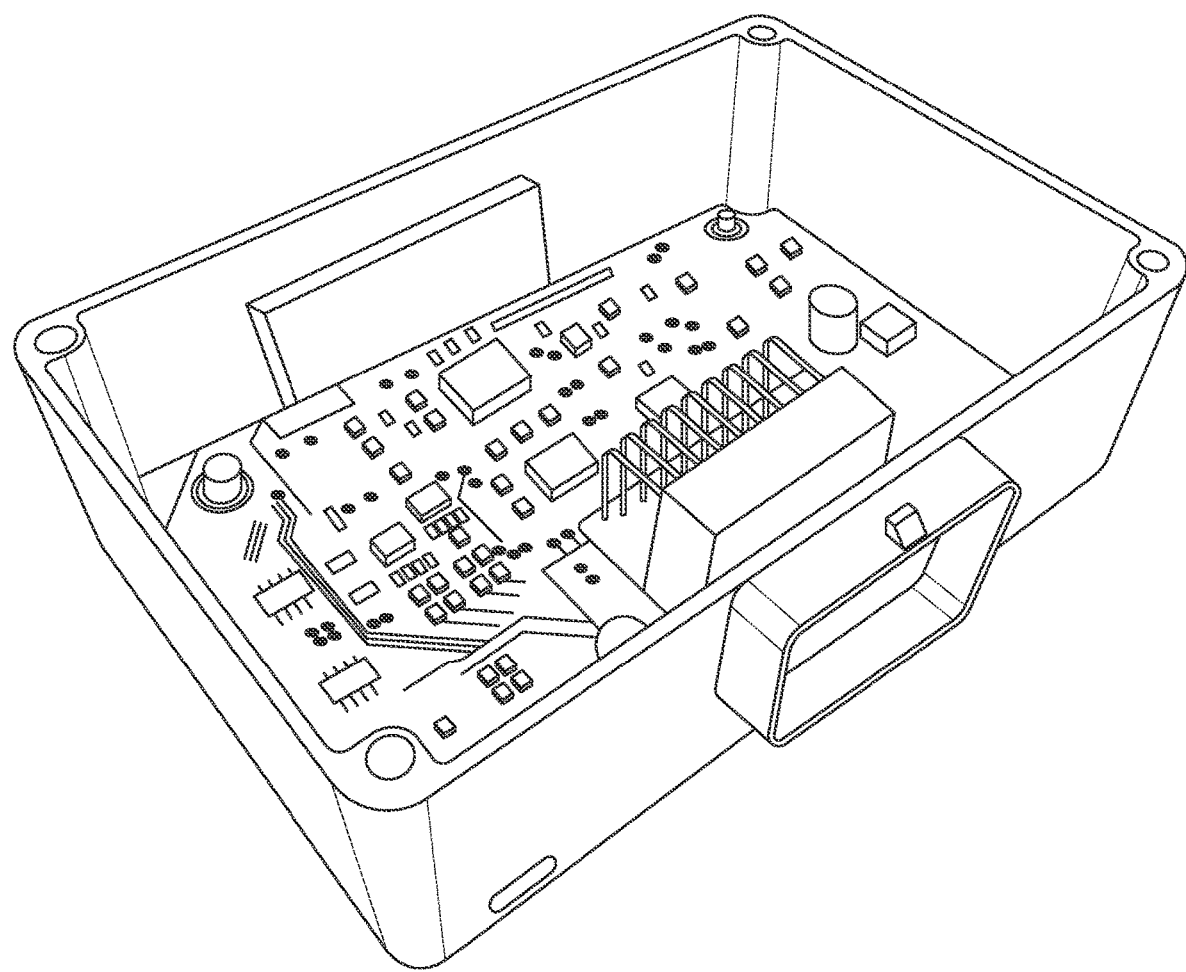
FIG. 2 depicts an illustration of an interior view of the electronic control unit adapter of FIG. 1.
Figure 3A:
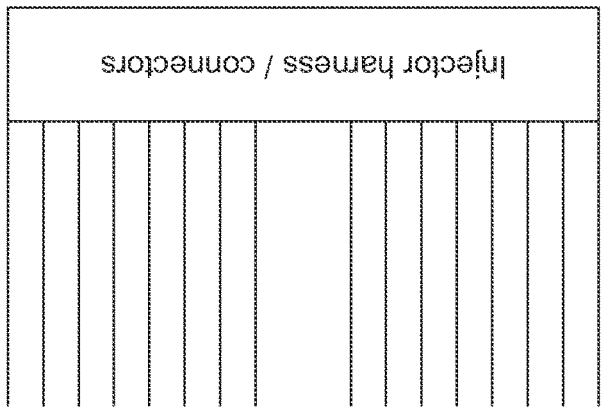
Figure 3A:
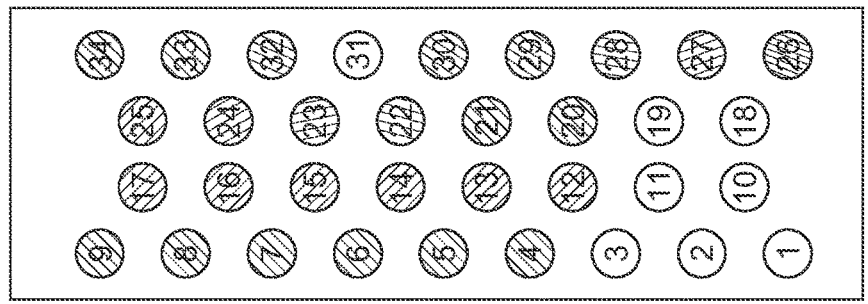
Figure 3B:
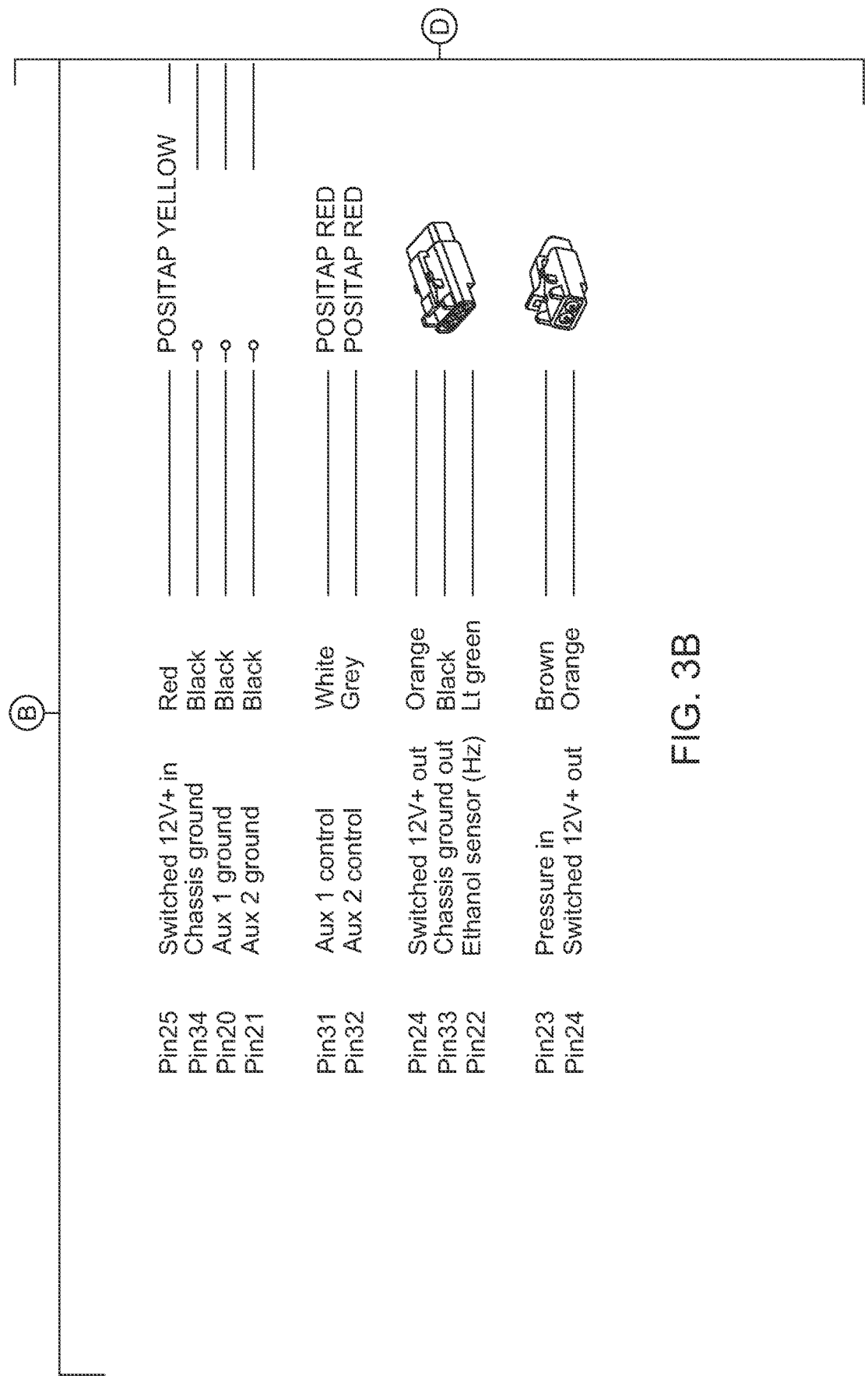
Figure 3C:
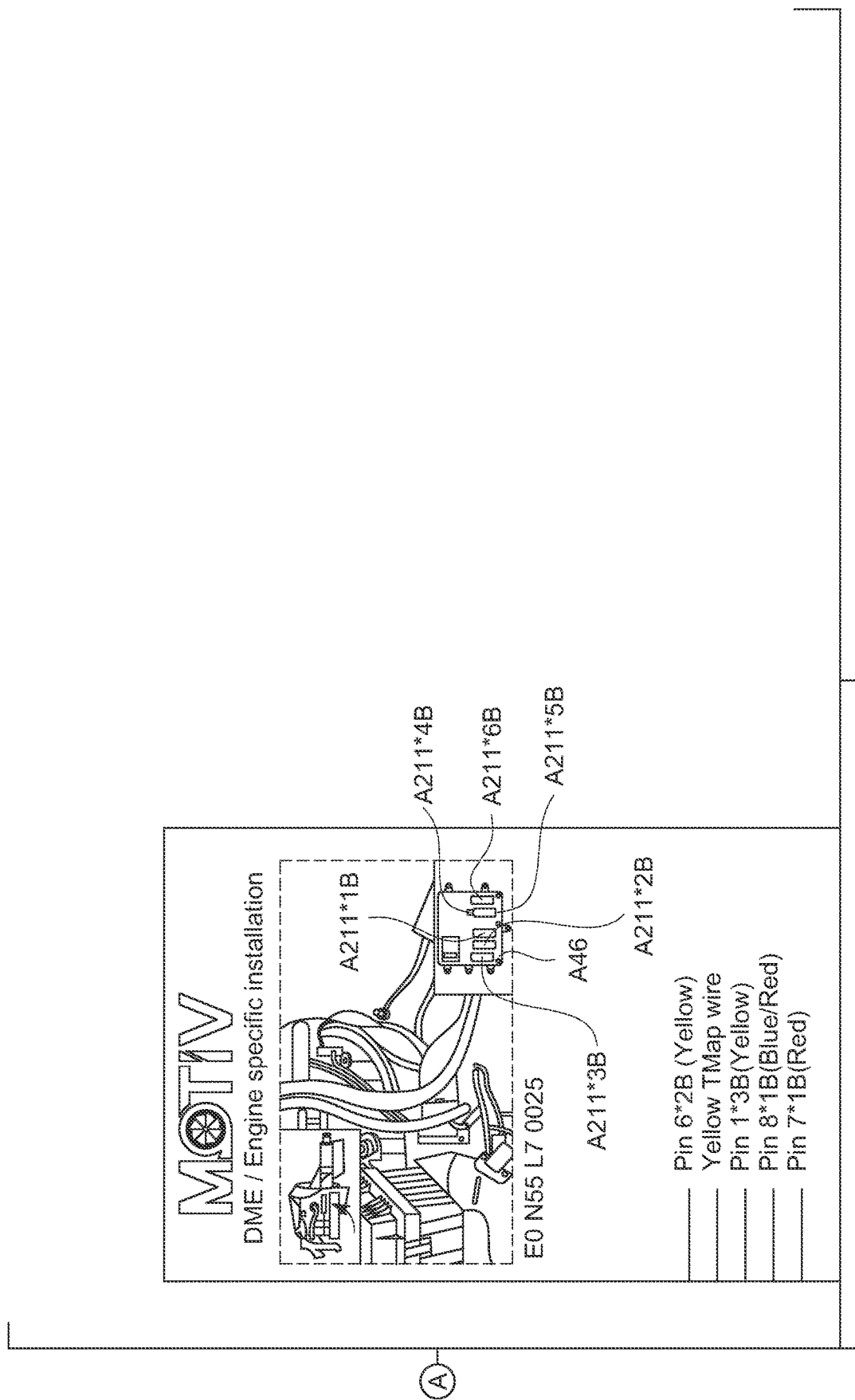

Electronic control unit adapter may have a housing mechanically connected with a printed circuit board positioned inside the interior of the housing as shown in FIG. 1 and FIG. 2. In the present embodiment, housing may adopt a shell structure formed from a mold. Electronic control unit adapter 100 may have a rectangular prism shape, however this is non-limiting and electronic control unit adapter 100 may be any suitable shape such as square prism, sphere, or pyramid. Electronic control unit adapter 100 may be manufactured such that the one or more adapter-connectors are integrated to it.

In one or more embodiments, printed circuit board may be used for electrically connecting with electronic control unit and outside electronic and mechanical components of internal combustion engine and vehicle using conductive mounts, tracks, pins, pads and other features etched from one or more sheet layers of copper laminated onto and/or between sheet layers of a non-conductive substrate. Pins may be used for various plug-in supplemental input output applications and board to board interconnection. Electronic control unit adapter may have separate LEDs that are used inside the housing to show system status and may be updated at a 20 Hz rate. The status LED may be a single while the System LED is an RGB LED.

Figure 4A:
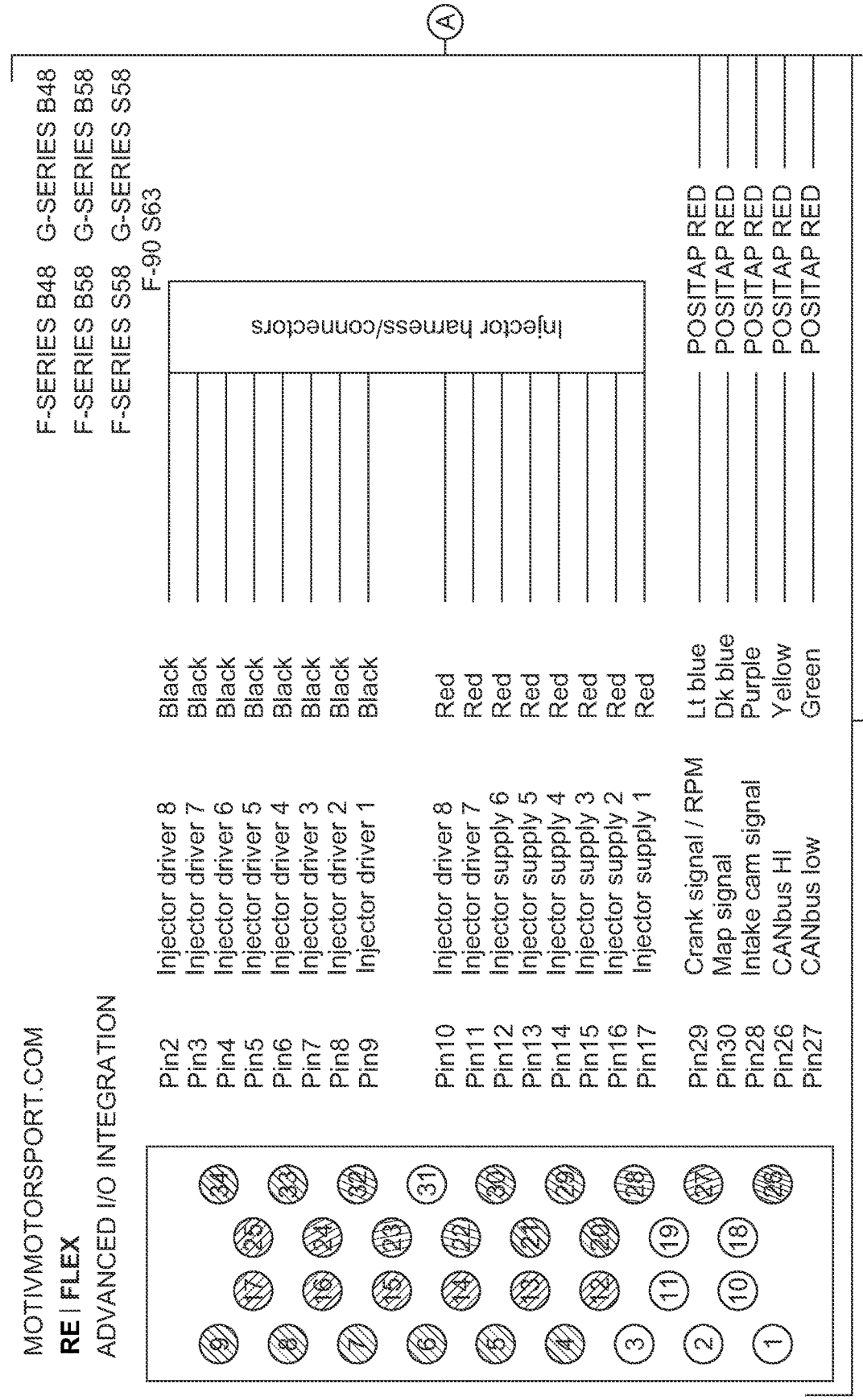
Figure 4B:
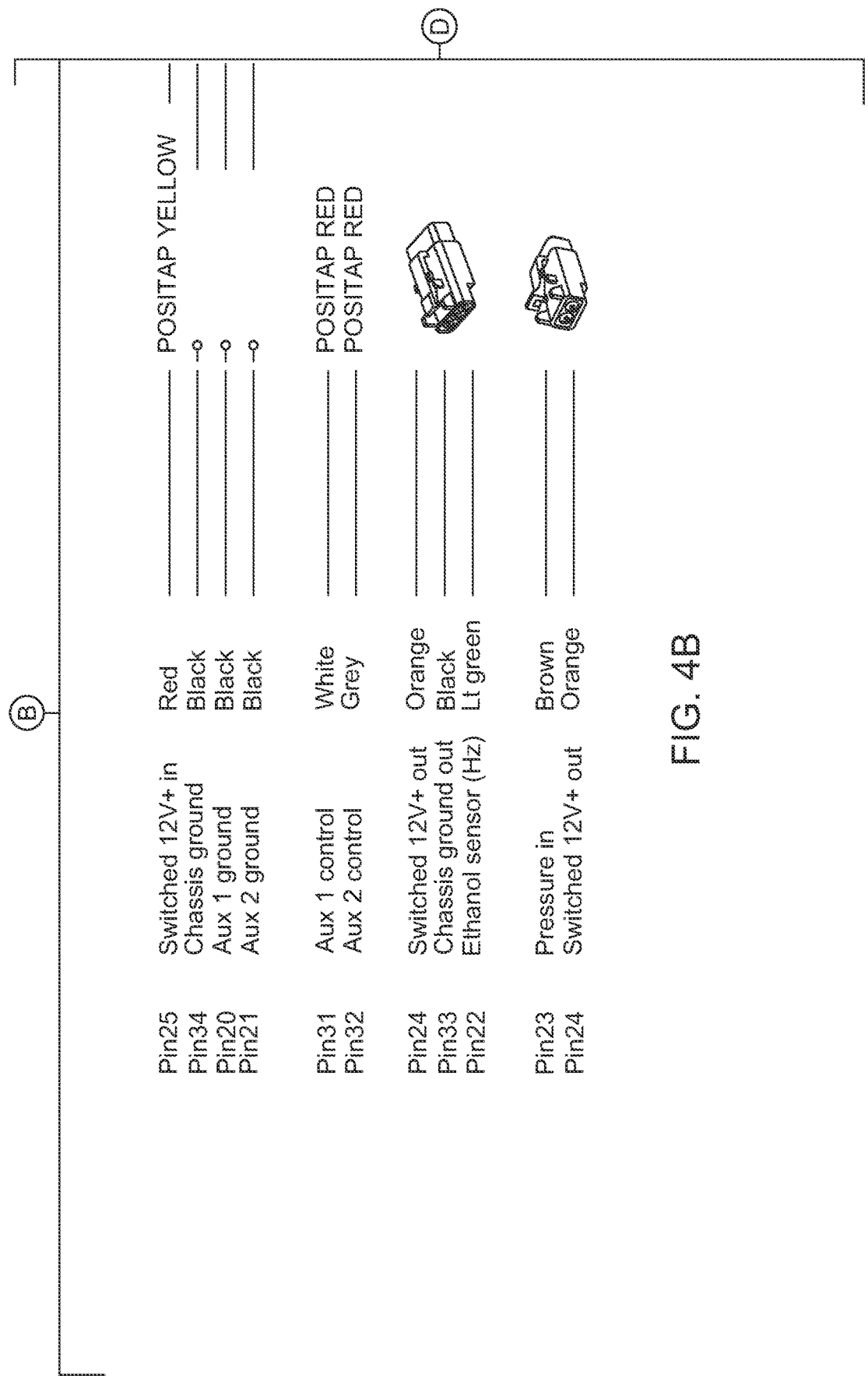
Figure 4C:
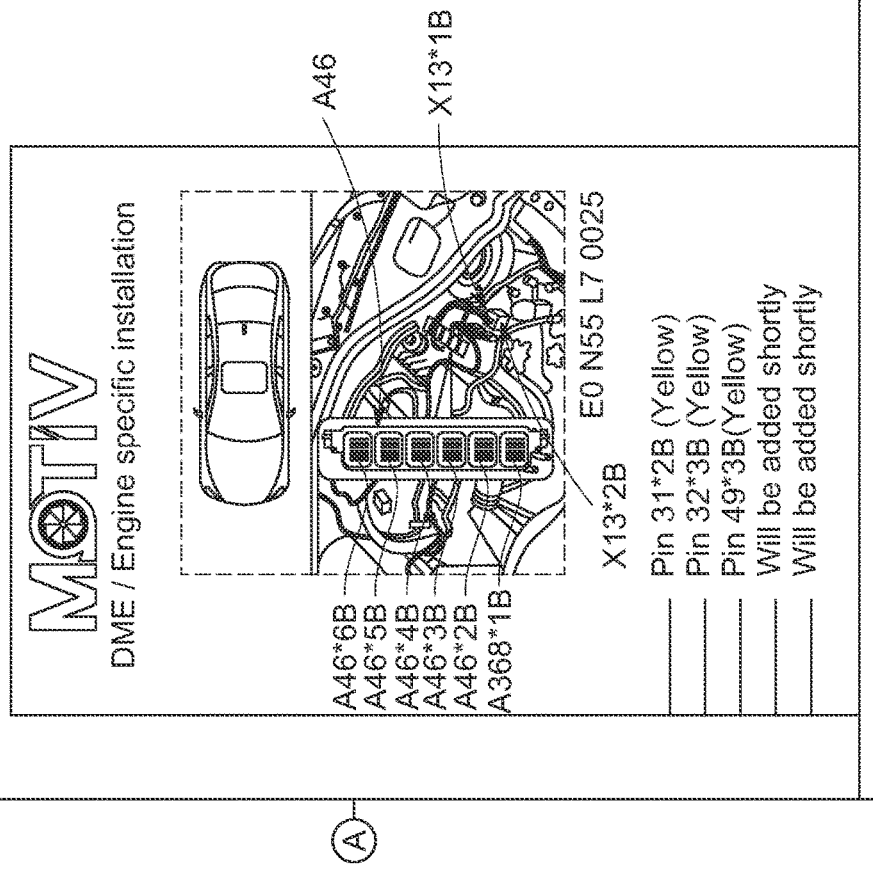

FIGS. 3 and 4 illustrated schematic diagrams of embodiments of non-limiting embodiments showing definitions of pins of an electronic control unit adapter 100. The connector pins of electronic control unit adapter 100 may be divided into multiple groups of connector pins such as but not limited to injector drivers, injector supplies, a crank signal, a map signal, an intake cam signal, a CANbus High and CANbus Low, switched 12V+ in, chassis ground, auxiliary 1 and 2 ground, auxiliary 1 and 2 control, switched 12V+ out, chassis ground out, ethanol sensor, pressure in, and switched 12V+ out.

Figure 5:
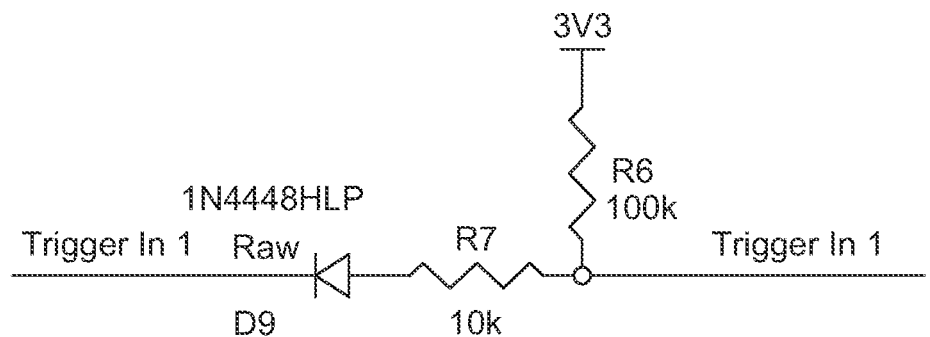
FIG. 5 depicts an illustration of a of circuit diagram for an input 1 for an ethanol sensor or digital input.
Figure 6:
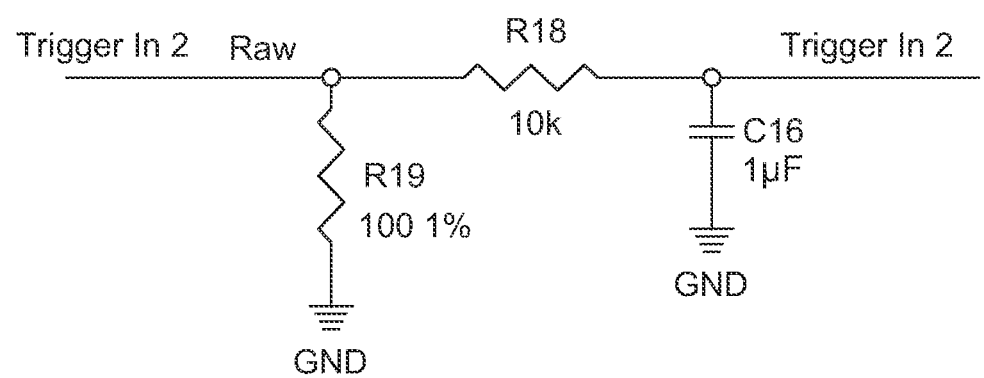
FIG. 6 depicts an illustration of a circuit diagram for an input 2 for a current sensor, digital input, or analog.

Inputs of electronic control unit adapter 100 may be configured via a USB connection to a PC via program such as but not limited to TPRT or another program that allows editing and upload/download of calibration and configuration values as a Digital, Analog, Ethanol Sensor, or Current Sensor. FIG. 5 shows an illustration of a circuit diagram for an Input 1 for an Ethanol Sensor or Digital Input. FIG. 6 shows an illustration of a circuit diagram for an Input 2 for an Current Sensor, Digital Input, or Analog. Analog Range, in one non-limiting embodiment, may be from 0-3.3 volts, 4096(12-bit) steps. Ethanol Sensor, in one non-limiting embodiment, may be 50-150 Hz with a pulse width of 1-5 ms. Current Sensor in one non-limiting embodiment may be 4-20 mA input with a 100 ohm resistor to ground, yielding 100 mV/mA. Input may be filtered with a low-pass filter, 15 Hz cutoff frequency.

Electronic control unit adapter 100 may have an EEPROM acting as user-modifiable read-only memory (ROM) that may be erased and reprogrammed repeatedly through the application of higher than normal electrical voltage. EEPROM data may be stored every three minutes of run time for future diagnostic use. When EEPROM-stored values are modified by TPRT, the EEPROM write routing may be triggered to keep the non-volatile configuration concurrent with the live data.

On startup, configuration data is loaded from EEPROM and checked with a checksum routine. USB system may then be initialized and is then setup to handle handshaking with a PC host autonomously. PC host may have one or more computing devices which will be discussed later in the description. Message datagrams may then be handled when received. External interrupt handlers may then be initialized for CAM and MAP signals. CANbus may then then initialized. Custom input handler for keyboard commands via CAN may then initialized and will be checked each time a message passes through the filters into the input handler.

The main state machine of the program may be identified as InjectorStateHandler and may be called every 10 ms. The InjectorStateHandler function tracks the inputs to determine when the engine is running and injections are required. It also monitors the BENCH_TEST_ACTIVE flag to handle the invoked bench test mode.

Engine RPM may be calculated every 10 milliseconds from a running average of the time between pulses on the RPM input. Injector Pulse Width may then be calculated using RPM, and the MAP pressure, filtered, from the analog sub-system. The pulse width is interpolated from the injectionTime lookup table. The following is example of a non-limiting code of how the Injector Pulse Width is calculated.

```
injectorPulseWidth = intrp__2ditable(//in ms* 100 -> 0.00
mapPressurePSI,
iEngineRPM,
INJECTION_MAP_BINS,
INJECTION_RPM_BINS,
&injectionMAPBins[0],
&injectionRPMBins[0],
¤tData.injectionTime[0][0]
);
```

During Bench Test mode, the injection time may be overridden by a value stored in a separate EEPROM table. Every 50 milliseconds the ethanol percentage and fuel temperature may be calculated based on the input. Additionally every 50 milliseconds electronic control unit adapter 100 may send an "Ethanol Message" via CAN. The following is example of a non-limiting example of the message content.

Message Content:
ourData[0]=ethanolPercentage;
ourData[1]=injectorState;
ourData[2]=0x22;
ourData[3]=fuelPressureCAN;
ourData[4]=injectorDutyCycleCAN;
ourData[5]=aux1OutputDutyCycle;
ourData[6]=aux2OutputDutyCycle;
ourData[7]=heartbeat++;

As discussed, the first group of the connector pins may include pins for injector drivers whereby may include a number of pins, for coupling to a number of injector drivers. In this embodiment pin 2, 3, 4, 5, 6, 7, 8, 9, 10, and 11 may correspond to injector driver 8, 7, 6, 5, 4, 3, 2, 1, 8, and 7 respectively. Injector Drivers may be any number of purpose-built automotive solenoid/injector driver such as but not limited to a 2×-Infineon TLE9104. Injector Drivers may be peak-and-hold, saturated, or other known those by ordinary skill in the art. Injector Drivers may be digitally controlled individual outputs with configuration and fault reporting via SPI (serial peripheral interface) bus. Each driver may have four independent outputs with two per controller. OFF state and ON state diagnostic configurations and activation may be possible via TPRT. The micro may poll both of the chips diagnostic status as part of the Injector Handler function every 10 ms. Injector drivers may be used with four, six, or eight cylinder internal combustion engines. Cylinders may be batch fired in any combination, meaning that multiple injectors may be fired simultaneously using calibrations. Cylinders may be sequentially fired in any order with increasing time.

The second group of the connector pins may include pins for injector supplies whereby may include a number of pins, for coupling to a number of injector supplies. In this embodiment pin 12, 13, 14, 15, 16, 17, may correspond to injector supply 6, 5, 4, 3, 2, and 1 respectively.

The third group of the connector pins may include pins for a crankshaft signal. In this embodiment pin 29 may correspond to the crankshaft signal for receiving a crankshaft signal in the form of a pulse train of a predetermined angular interval corresponding to the rotation of a crankshaft of the internal combustion engine and measuring a pulse interval of the crankshaft signal. The input may have calibrations for the number of teeth and polarity. The interrupt may fire on every fourth tooth edge and averages the last three teeth.

The fourth group of the connector pins may include pins for a manifold absolute pressure sensor. In this embodiment pin 30 may correspond to the manifold absolute pressure sensor signal. The manifold absolute pressure signal may be used for engine load input and may be used to calculate the correct amount of fuel to inject into the cylinders.

The fifth group of the connector pins may include pins for an intake cam signal. In this embodiment pin 28 may correspond to the intake cam signal. The intake cam signal gathers information about the vehicle's camshaft speed. Electronic control unit adapter 100 may use this data to determine the timing of the ignition, as well as the timing of the fuel injection that the engine requires.

When the cam input triggers at the desired point, several calculations occur and the injection cycle begins. The trigger time for each injection pulse is calculated based on RPM and the calibration table for degrees. The following is example of a non-limiting code of how many microseconds should pass for each cylinder.

```
for (i = 0; i < 8; i++) {
  uS_UntillNextInjection[i] = ((uint32_t) (uS_DD + 1) * (uint32_t) currentData.deviceSettings.firingAngle[i]) * DD_SCALING_FACTOR;
  if (uS_UntillNextInjection[i] < MIN_TRIGGER_US) {
    uS_UntillNextInjection[i] = MIN_TRIGGER_US;
  }
}
```

At the same time as this process, the firing time for the first cylinder in the firing order is being loaded into the next available (of the 3) duration timers. Once that cylinder has begun its cycle, the timer is released and is then available for the next cylinder in the rotation.

The sixth group of the connector pins may include pins for intake CANbus Hi and CANbus Low. In this embodiment pin 26 and 27 may correspond to the CANbus Hi and CANbus Low respectively whereby the sensors and actuators communicate with electronic control unit adapter 100 through CANbus Hi and CANbus Low to integrate aftermarket parts and add-ons for automobiles to the electronic control unit. At least one configuration may include a pin connecting to a low-side switch for CANbus, for coupling to respective first terminals of electronic control unit adapter 100, and may further include each different respective pin of at least a subset of the remaining pins connecting to a respective independent high-side switch, for coupling to a respective second terminal of electronic control unit adapter 100.

Electronic control unit adapter 100 may incorporate external data into the electronic control adapter in parallel through optional CANbus integration. Utilizing the CANbus, multiple digital and analog signals may be used by the electronic control unit adapter for safety, data logging, or adaptive tuning features. In this configuration OBDII and other functionality is unaffected by the communication with electronic control unit adapter. In one or more embodiments electronic control unit adapter 100 may control injector outputs using its own signals and calibration tables. Electronic control unit adapter 100 may also have one or more settings to switch output to a client/slave scenario where the output pulse width (and/or duty cycle) may then be controlled/requested by the electronic control unit.

The connection of CANbus between electronic control unit adapter 100 and electronic control unit provides the ability to switch between control of program add-ons through tables in electronic control unit adapter 100 and control of outputs directly by tables in the electronic control unit. Electronic control unit adapter 100 and the electronic control unit may exchange data between each other and vehicle components so electronic control unit adapter 100 may make decisions on how to proceed. For example, a message would be sent to electronic control unit adapter 100 from one or more sensors to communicate a process corresponding with the engine whereby electronic control unit adapter 100 would decode the messages according to the standardized frame format of the protocol. Electronic control unit adapter 100 would then communicate over CANbus with the electronic control unit to determine which of the stored data and tables should be utilized for output to engine in response to the received process data. Electronic control unit adapter 100 would then transmit output in a suitable frame format of the protocol.

Additionally CANbus allows electronic control unit adapter 100 to communicate to and from electronic control unit for error reporting of either components. CANbus may facilitate output in the form of a wastegate duty (WGDC) by converting a electronic wastegate signal to a more conventional DC output for controlling standard 3 port and 4 port boost solenoids for use with external wastegates. CANbus provides the ability to data log non factory parameters such as but not limited to ethanol content, additional pressure sensor, or p or injection duty cycle.

Additionally, since electronic control unit adapter 100 is reporting the fault status of the individual injectors, electronic control unit adapter 100 may be disabled locally with its own fault handler, or from a combination of commands from the electronic control unit (override, and then command OFF). Electronic control unit adapter 100 may also tie its own direct injection fault status, or fuel control to adjust output on a per cylinder basis such that fuel balance between direct injection and port injection or matching fueling between the direct injection and p or injection may be achieved. For instance, in a scenario where the direct injection is turning off the fueling for a particular cylinder, electronic control unit adapter 100 may further allow shutting off any external fueling as well.

The seventh group of the connector pins may include pin 25 for switched 12V+ in. The eighth group of the connector pins may include pin 34 for chassis ground.

The eighth group of the connector pins may include pins for auxiliary control. In this embodiment pins 31, 32 may correspond to auxiliary 1 control and auxiliary 2 control respectively. Auxiliary 1 control and auxiliary 2 control may be active-low FET circuits that can be configured via TPRT via individual calibration tables with MAP and RPM as the x and y axis. Auxiliary 1 control and auxiliary 2 control may be interpolated using the following command:

```
aux1OutputDutyCycle = intrp_2dctable(//in % 0 - 100
  mapPressurePSI,
  iEngineRPM,
```

```
        AUXOUT_MAP_BINS,
        AUXOUT_RPM_BINS,
        &auxOutMAPBins[0],
        &auxOutRPMBins[0],
        ¤tData.auxOut1DutyCycle[0][0]
    );
    aux2OutputDutyCycle = intrp__2dctable(//in % 0 - 100
    mapPressurePSI,
    iEngineRPM,
        AUXOUT_MAP_BINS,
        AUXOUT_RPM_BINS,
        &auxOutMAPBins[0],
        &auxOutRPMBins[0],
        ¤tData.auxOut2DutyCycle[0][0]
    );
```

The ninth group of the connector pins may include pins for auxiliary ground. In this embodiment pins 20, 21 may correspond to auxiliary 1 ground and auxiliary 2 ground respectively. The tenth group of the connector pins may include pin 24 for switched 12V+ out. The eleventh group of the connector pins may include pin 33 for chassis ground out.

The twelfth group of the connector pins may include pin 22 for an ethanol sensor whereby the ethanol sensor sends a respective first signal to electronic control unit adapter 100 corresponding with the amount of alcohol in the fuel. Electronic control unit adapter 100 may also include a PNP ethanol sensor harness, PNP ethanol sensor breakout adaptor, and PNP 0-10 Bar Pressure Sensor. The ethanol sensor may send the first signal to electronic control unit adapter 100, whereby the first signal includes the current alcohol level within the fuel of the fuel line. A table may be preprogrammed within electronic control unit adapter 100 to match up the signal received from the ethanol sensor to an amount of fuel that needs to be injected according to the current RPMs of the engine of the vehicle.

Electronic control unit adapter 100 processes the voltage reading sent from ethanol sensors to determine how much additional fuel is needed to be inputted within the engine by the fuel flow valves to maintain or achieve the optimal air/fuel ratio and alcohol/fuel ratio. Electronic control unit adapter 100 may include a preprogrammed table to be utilized in conjunction with the ethanol sensors. The preprogrammed table may include a plurality of optimal alcohol levels in the form of an interpolated curve to match up with a corresponding desired RPM and of the engine and throttle position of the accelerator connected to the engine for that optimal alcohol level. If the current ethanol level does not substantially match the optimal alcohol level, electronic control unit adapter 100 sends a signal to the fuel flow valves to inject fuel within the fuel rail or prevent fuel from being injected within the fuel rail according to the difference in the optimal alcohol level and the current ethanol level.

The thirteenth group of the connector pins includes pin 23 for pressure in. The fourteenth group of the connector pins includes pin 24 for switched 12V+ out.

Figure 7:
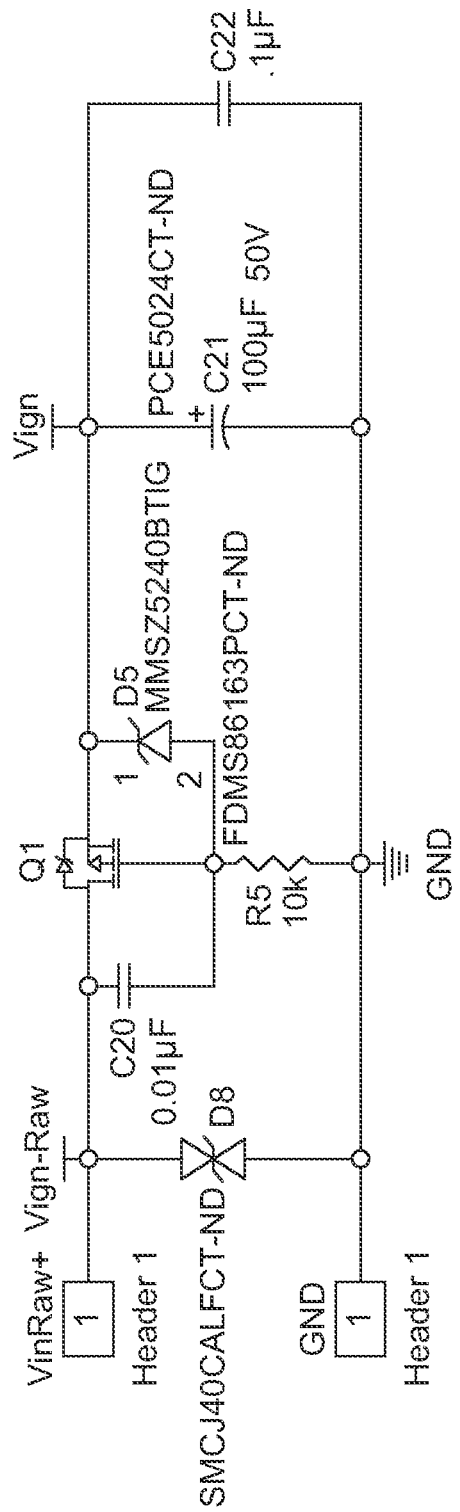
FIG. 7 depicts an illustration of a circuit diagram for an embodiment of the hardware reverse polarity protection.

Electronic control unit adapter 100 may be optimized for use in an automotive environment by implementing reverse polarity protection by an internal circuit configuration that ensures that electronic control unit adapter 100 is not damaged if the power supply polarity is reversed. The reverse polarity protection circuit cuts off current flow to the sensitive electronic circuits. FIG. 7 shows an illustration of a circuit diagram for an embodiment of the Hardware Reverse Polarity Protection.

Figure 8:
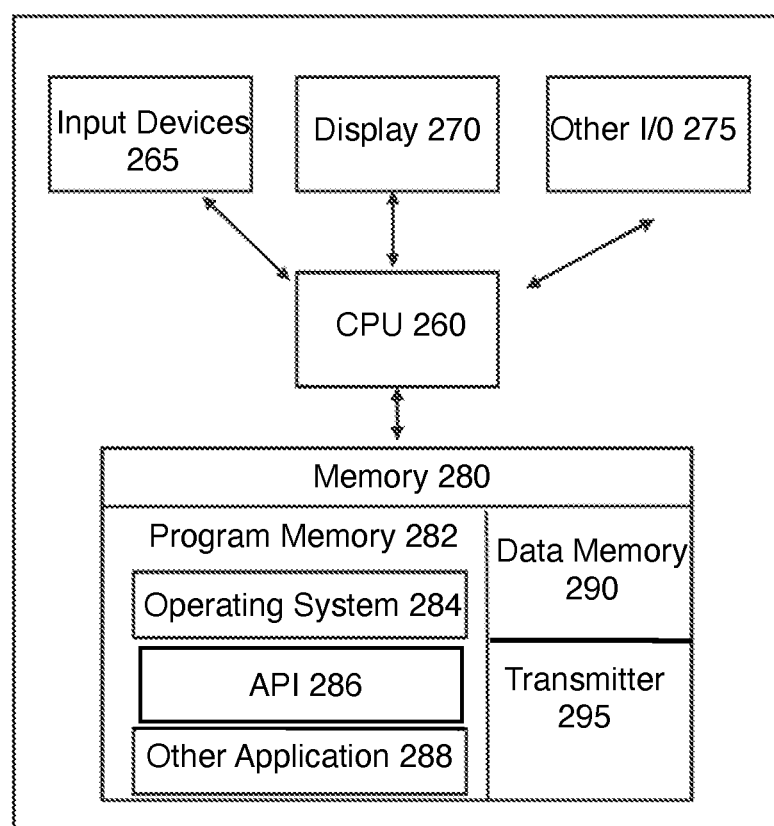
FIG. 8 depicts the components of a computing device of PC host.

Turning to FIG. 8, FIG. 8 is a block diagram showing various components of computing device 200 of PC host which may be connected to electronic control unit adapter 100. Computing device 200 may comprise a housing for containing one or more hardware components that allow access to edit and query electronic control unit adapter 100. Computing device 200 may include one or more input devices such as input devices 265 that provide input to a CPU (processor) such as CPU 260 of actions related to a user. Input devices 265 may be implemented as a keyboard, a touchscreen, a mouse, via voice activation, wearable input device, a camera a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 270 may also comprise a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of computing device 200.

Computing device 200 may have a transmitter 295, such as transmitter 295, to transmit the vehicle performance data. Transmitter 295 may have a wired or wireless connection and may comprise a multi-band cellular transmitter to connect to the server 300 over 2G/3G/4G cellular networks. Other embodiments may also utilize Near Field Communication (NFC), Bluetooth, or another method to communicate information.

The following may be used as a reference for identification of the constituents in the aforementioned command language:

Aux: Auxiliary
Cyl: Cylinder
DC: Duty cycle
DME: Digital motor electronics (BMW Models)
E %: Ethanol percentage
ECA: Ethanol content analyzer
ECU: Engine control unit
EGBP: Exhaust gas back pressure
EWG: Electronic wastegate
PWM: Pulse width modulation
IDC: Injector duty cycle
IPW: Injector pulse width
MAP: Manifold absolute pressure sensor
ms: milliseconds
PI: Port injection
PID: Proportional, integral, and derivative (closed loop error control)
TMAP: Temperature and Manifold absolute sensor
Tx/Rx: Transmit and receive
WGDC: Wastegate duty cycle The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

The invention claimed is:

1. An electronic control unit for supplementing a preexisting electronic control unit of a vehicle with additional integration for an engine, the electronic control unit comprising:
   a circuit board; and
   one or more inputs and a connection system, the connection system in communication with the electronic control unit, wherein the one or more inputs are configured via a connection to a computing device via a program for editing and upload or download of calibration and configuration values.

2. The electronic control unit of claim 1, further comprising EEPROM having configuration data, wherein the EEPROM is erasable and reprogrammable through an application of an increased electrical voltage.

3. The electronic control unit of claim 2, the EEPROM having a main state that tracks the one or more inputs to determine when the engine is running and injections that are required.

4. The electronic control unit of claim 1, the connection system having one or more injector driver connectors for coupling to one or more injector drivers.

5. The electronic control unit of claim 1, the connection system having one or more injector supply connectors for coupling to one or more injector supplies.

6. The electronic control unit of claim 1, the connection system having one or more crankshaft signal connectors for receiving a crankshaft signal in a form of a pulse train of a predetermined angular interval corresponding to a rotation of a crankshaft of the engine and measuring a pulse interval of the crankshaft signal.

7. The electronic control unit of claim 1, the connection system having one or more manifold absolute pressure sensor signal connectors for engine load input and to calculate an amount of fuel to inject into one or more cylinders of the engine.

8. The electronic control unit of claim 1, the connection system having one or more intake cam signal connectors used for gathering information about a camshaft speed of the vehicle.

9. The electronic control unit of claim 1, the connection system having one or more auxiliary control connectors and one or more auxiliary controls wherein the one or more auxiliary controls are active-low FET circuits configured via TPRT via individual calibration tables with MAP and RPM as an x and y axis.

10. The electronic control unit of claim 1, the connection system having one or more ethanol sensor connectors with an ethanol sensor wherein the ethanol sensor sends a respective first signal to electronic control unit adapter corresponding with an amount of alcohol in fuel of the vehicle.

11. An electronic control unit adapter comprising:
    a circuit board; and
    one or more inputs and a connection system, the connection system in communication with a separate preexisting electronic control unit in a vehicle wherein the electronic control unit adapter is retrofitted into the vehicle, wherein the electronic control unit adapter is operable as a separate standalone in addition to a parallel module in conjunction with the electronic control unit adapter.

12. The electronic control unit adapter of claim 11, further comprising auxiliary outputs.

13. The electronic control unit adapter of claim 12, the auxiliary outputs comprising a progressive or pulse width modulation methanol control, a progressive or pulse width modulation nitrous control, an auxiliary fuel pump trigger, an exhaust cutout control, or an external boost control.

14. The electronic control unit adapter of claim 13, the auxiliary outputs having resolution tables for control in TunerPro R/T that are configured to run as on/off, digital, frequency, or proportional, integral, and derivative.

15. The electronic control unit adapter of claim 14, further comprising EEPROM having configuration data, wherein the EEPROM is erasable and reprogrammable through an application of an increased electrical voltage.

16. The electronic control unit adapter of claim 15, the EEPROM having a main state that tracks the one or more inputs to determine when a connected engine is running and injections that are required.

17. An electronic control unit adapter comprising:
    a circuit board; and
    one or more inputs and a connection system, the connection system in communication with a separate preexisting electronic control unit in a vehicle wherein the electronic control unit adapter is retrofitted into the vehicle, wherein the electronic control unit adapter having output integration for sequential port fuel injection for four to eight cylinder engines utilizing a manifold absolute pressure sensor RPM Table with configurable triggers for any suitable vehicle application.

18. An electronic control unit adapter comprising:

a circuit board; and one or more inputs and a connection system, the connection system in communication with a separate preexisting electronic control unit in a vehicle wherein the electronic control unit adapter is retrofitted into the vehicle, the electronic control unit adapter having built in ethanol content analyzer providing flex fuel capability and port injection scaling based on real time data or vehicle conditions.

19. An electronic control unit for supplementing a preexisting electronic control unit of a vehicle with additional integration for an engine, the electronic control unit comprising:

a circuit board;

one or more inputs and a connection system, the connection system in communication with the electronic control unit, wherein the connection system is connected to the electronic control unit by a CANbus, wherein the CANbus facilitates output in a form of a wastegate duty converting an electronic wastegate signal to a DC output for controlling standard 3 port and 4 port boost solenoids for use with external wastegates;

injector driver connectors for coupling to one or more injector drivers;

a nitrous control;

a methanol control;

an ethanol content analyzer providing flex fuel capability; and an auxiliary fuel pump trigger.

* * * * *